US009738119B2

(12) United States Patent
Mariani et al.

(10) Patent No.: US 9,738,119 B2
(45) Date of Patent: Aug. 22, 2017

(54) MOTORCYCLE TYRE AND PAIR OF MOTORCYCLE TYRES

(75) Inventors: Mario Mariani, Milan (IT); Sandro Gallo, Milan (IT); Andrea Schiavolin, Milan (IT); Pierangelo Misani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1375 days.

(21) Appl. No.: 13/519,571

(22) PCT Filed: Dec. 23, 2010

(86) PCT No.: PCT/IB2010/003341
§ 371 (c)(1),
(2), (4) Date: Jun. 27, 2012

(87) PCT Pub. No.: WO2011/080566
PCT Pub. Date: Jul. 7, 2011

(65) Prior Publication Data
US 2012/0285593 A1 Nov. 15, 2012

Related U.S. Application Data

(60) Provisional application No. 61/319,284, filed on Mar. 31, 2010.

(30) Foreign Application Priority Data

Dec. 29, 2009 (IT) .............................. RM2009A0688

(51) Int. Cl.
*B60C 11/03* (2006.01)
*B60C 11/117* (2006.01)

(52) U.S. Cl.
CPC ........ *B60C 11/0302* (2013.01); *B60C 11/033* (2013.04); *B60C 11/032* (2013.04);
(Continued)

(58) Field of Classification Search
CPC ......... B60C 11/0302; B60C 2011/0372; B60C 11/033; B60C 2011/0374; B60C 2011/0388; B60C 11/032
See application file for complete search history.

(56) References Cited

U.S. PATENT DOCUMENTS

D434,353 S * 11/2000 Jackson .................. D12/535
2005/0039835 A1* 2/2005 Yamane .............. B60C 11/0302
152/209.11

FOREIGN PATENT DOCUMENTS

EP 1 508 456 A2 2/2005
EP 1 826 026 A1 8/2007
(Continued)

OTHER PUBLICATIONS

Machine translation for Japan 2007-331596 (no date).*
(Continued)

*Primary Examiner* — Steven D Maki
(74) *Attorney, Agent, or Firm* — Finnegan, Henderson, Farabow, Garrett & Dunner, L.L.P.

(57) ABSTRACT

A motorcycle tyre has a tread band including a central portion and two shoulder portions arranged at axially opposite sides of the central portion. The central portion includes a first plurality of grooves extended according to a substantially longitudinal direction and alternatively arranged at opposite sides of the equatorial plane of the tyre. Each groove of the first plurality of grooves has a substantially curvilinear course such as to form a concavity. The central portion further includes a sub-portion substantially free of grooves placed astride the equatorial plane of the tyre. Each of the shoulder portions includes a second plurality of grooves arranged obliquely relative to the equatorial plane of the tyre.

15 Claims, 8 Drawing Sheets

(52) U.S. Cl.
CPC ............... *B60C 2011/0372* (2013.04); *B60C 2011/0374* (2013.04); *B60C 2011/0388* (2013.04); *B60C 2200/10* (2013.04); *Y10T 29/49538* (2015.01)

(56) References Cited

FOREIGN PATENT DOCUMENTS

| | | | |
|---|---|---|---|
| JP | 63-315307 A | * | 12/1988 |
| JP | 06-143931 | | 5/1994 |
| JP | 2001-030719 A | * | 2/2001 |
| JP | 2007-331596 A | * | 12/2007 |

OTHER PUBLICATIONS

Machine translation for Japan 2001-030719 (no date).*
Machine translation for Japan 63-315307 (no date).*
International Search Report from the European Patent Office for International Application No. PCT/IB2010/003341, mailing date Apr. 28, 2011.

* cited by examiner

MOTORCYCLE TYRE AND PAIR OF MOTORCYCLE TYRES

CROSS REFERENCE TO RELATED APPLICATIONS

The application is a national phase application based on PCT/IB2010/003341, filed Dec. 23, 2010, and claims the priority of Italian Application No. RM2009A000688, filed Dec. 29, 2009, and the benefit of U.S. Provisional Application 61/319,284, filed Mar. 31, 2010, the content of all of which is incorporated herein by reference.

BACKGROUND OF THE INVENTION

Field of the Invention

The present invention relates to motorcycle tyres. In particular, the present invention relates to tyres intended to be mounted on the front wheel of motorcycles of the "Supersport" and/or "Sport Touring" segment, having large engine capacity (e.g. 600 $cm^3$ or higher), and/or high power (e.g. 170-180 hp or higher), also used on tracks.

Description of the Related Art

In recent times a trend has been observed to introduce in the market motorcycles for Supersport or Sport Touring use having high power. For example, motorcycles for road use having an engine capacity of 1000 $cm^3$ or higher, with powers of 180 hp, are in fact already available on the market.

For ensuring such high performances, the tyres mounted on the wheels of such motorcycles shall have excellent features as regards the grip to the ground, so as to be able to effectively transfer the high traction torque to the ground, both in straight running and while accelerating on leaving a bend, as well as ensure an effective braking action. The grip becomes a really critical issue above all when running on wet road surfaces.

For ensuring to the motorcyclist that such performances are reached in a fully safe condition, the tyres shall ensure, together with a very good grip to the ground, behaviour stability both in straight running and while running on bends, particularly in conditions of high acceleration/deceleration. In fact, a stable behaviour of the tyre indicates its capacity to effectively dampen perturbations transmitted by the unevenness of the road surface while running, so that such perturbations are not propagated to the motorcycle, thus compromising the driving stability.

Patent application EP 1826026 describes a tyre for motorcycles, especially adapted to be used as a front tyre of a racing motorcycle, comprising a tread portion provided with at least one pair of circumferential grooves extending generally in a circumferential direction of the tyre and oppositely disposed relative to the equatorial plane of the tyre, and a plurality of grooves inclined with respect to the circumferential direction and extending from an outer side to an inner side in a width direction on the tread band. At least half of the inclined grooves extend across the equatorial plane of the tyre. According to EP 1826026, this choice allows a tyre with extremely light handling and stable when braking to be obtained.

FIGS. 1a and 1b show tread pattern portions respectively of the front and rear Sportec™ M3 tyres. The Sportec™ M3 tyres, presently marketed by Metzeler™, are very much appreciated by motorcyclist keen on the Supersport segment.

SUMMARY OF THE INVENTION

Looking for an improvement of the Sportec™ M3 tyre, the Applicant has found that by arranging a series of substantially longitudinal grooves, having a substantially curvilinear course, in a central portion of the tread band, and by leaving free of grooves a small portion of the tread band at the equatorial plane, it is possible to increase the surface of the footprint area of the tyre.

In particular, as shown hereinafter, it has been found that the increase in the surface of the footprint area is due to an increase in the width of the same.

The Applicant believes that such an outcome is due to the fact that the longitudinal and curvilinear grooves create a sort of "double hinge", which allows the crown portion of the tyre to be moved radially in a region away from the equatorial plane, so as to increase the compliance thereof. Moreover, the Applicant believes that the curvilinear arrangement (i.e. an arrangement not aligned with the equatorial plane, except for portions of least longitudinal extension) of such longitudinal grooves allows the compliance of the crown region to be increased in a controlled and not excessive way, so as not to cause either the fatigue failure of the tread band at the grooves themselves or an excessive leaning of the tyre on the footprint area. Thanks to the increase in the surface of the footprint area, it is thus favoured the behaviour stability of the tyre, particularly when conducted under a motorcycle in substantially straight running, without negatively affecting the graduality and/or the ease of making the motorcycle enter bends and/or mixed paths.

In particular, the increase in the surface of the footprint area is advantageously achieved thanks to an increase in the width of the latter, not to an increase in its length. In the Applicant's view, an excessive length of the footprint area is in fact to be avoided, because it may cause local drops of the contact pressure and/or uneven wear, due to an excessive and non linear returning action of the belt on the tread band in the outlet portion of the footprint area while running at small drift angles (as typically happens in straight running, which is never exactly so).

In a first aspect thereof, the invention relates to a method for increasing a footprint area of a motorcycle tyre in substantially straight running. The tyre comprises a tread band. The method comprises:
  forming in a central portion of said tread band a first plurality of grooves extended according to a substantially longitudinal direction and alternatively arranged at opposite sides of an equatorial plane of said tyre, wherein each groove of said first plurality of grooves has a substantially curvilinear course such as to form a concavity,
  leaving free of grooves a sub-portion of said central portion placed astride an equatorial plane of said tyre.

In a second aspect thereof, the invention relates to a motorcycle tyre, having a tread band comprising a central portion and two shoulder portions arranged at axially opposite sides of the central portion, wherein:
  the central portion comprises a first plurality of grooves extended according to a substantially longitudinal direction and alternatively arranged at opposite sides of an equatorial plane of said tyre, wherein each groove of said first plurality of grooves has a substantially curvilinear course such as to form a concavity;
  the central portion comprises a sub-portion substantially free of grooves placed astride an equatorial plane of said tyre;
  each of said shoulder portions comprises a second plurality of grooves arranged obliquely relative to the equatorial plane of said tyre.

For the purposes of the present invention, by "tread pattern" it is meant the representation of each point of the tread band (grooves included) on a plane perpendicular to the equatorial plane of the tyre and tangent to the maximum diameter of the tyre. In the representation:

in the lateral direction the distance of each point of the tread band from the equatorial plane corresponds to the distance of such point from the equatorial plane measured on the lateral development of the band itself;

in the circumferential direction the distance between any two points of the tread band corresponds to the distance between the projections of the two points on the circumference corresponding to the maximum diameter of the tyre, the projection being obtained by means of radial planes passing at the two points.

Angle measurements, and/or linear quantities (distances, widths, lengths, etc.), and/or surfaces are to be intended as referred to the tread pattern as defined above.

Furthermore, referring to the angle of the grooves formed in the tread band with respect to the equatorial plane of the tyre, such angle is to be intended, for each point of the groove, as referred to the angle (comprised, as absolute value, between 0° and 90°) defined by a rotation performed starting from the equatorial plane and reaching the direction tangent to the groove passing at that point.

For the purposes of the present invention, the following definitions are further applied:

By "motorcycle tyre" it is meant a tyre having a high curvature ratio (typically higher than 0.200), which allows high camber angles (for example 50°-60°) to be reached when the motorcycle runs on a bend.

By "equatorial plane" of the tyre it is meant a plane perpendicular to the rotation axis of the tyre and dividing the tyre into two symmetrically equal portions.

By "circumferential" or "longitudinal" direction it is meant a direction generically directed according to the rotation direction of the tyre, or in any case only slightly inclined with respect to the rotation direction of the tyre.

By "void to rubber ratio" it is meant the ratio between the total surface of the notches of a determined portion of the tread pattern of the tyre (possibly of the whole tread pattern) and the total surface of the determined portion of the tread pattern (possibly of the whole tread pattern).

By "lateral development" of the tread band it is meant the length of the arc defining the radially outermost profile of the tread band in a cross section of the tyre.

By "maximum longitudinal development" of the tread band it is meant the length of development of the tread band in the longitudinal direction at the radially outermost point of the tread band.

By "curvature ratio" of the tyre it is meant the ratio between the distance of the radially highest point of the tread band from the maximum chord of the tyre, and the same maximum chord of the tyre, in a cross section of the tyre.

By "longitudinal extension" of a groove it is meant the extension of the projection in the circumferential direction of the groove itself.

If not differently stated, by "extension" of a groove it is meant the length of the groove measured along its course.

By "average inclination" of a groove it is meant the arithmetical mean of the inclinations/angles of the portions forming the groove. For grooves with curvilinear course, the average inclination or average angle may be expressed as:

$$\frac{1}{L}\int_0^L \alpha(x)\,dx$$

Where a(x) represents the angle of the groove at the longitudinal "height" x and L represents the groove extension.

By "pitch" of the tyre it is meant the group of grooves and rubber parts arranged so as to form a portion of the pattern which is repeated on the tread band, substantially the same and without interruption along the circumferential development of the tread band. Along the circumferential development of the tread band, the pitches may have different circumferential lengths.

By "substantially longitudinal", referring to a groove, it is meant that such groove is arranged at an average angle with respect to the equatorial plane of the tyre which is substantially zero (e.g. of less than 10°).

By "substantially curvilinear" course of a groove it is meant a course with substantial continuity of the derivative of the curve representing the course itself. Typically, this is achieved by means of a course without sharp points. The present definition includes also the cases in which the groove is formed by or comprises a sequence of short straight sections, provided that the difference in the angular arrangement of such sections is not too large (e.g. larger than 25°).

The present invention, in one or more preferred aspects, may comprise one or more of the features hereinafter presented.

Each groove of said first plurality of grooves may extend longitudinally over at least 5% of a maximum longitudinal development of said tread band.

Said first plurality of grooves may be advantageously formed by a circumferential sequence of groove pairs comprising a first groove and a second groove, wherein said first groove is arranged at one side of said equatorial plane of the tyre and said second groove is arranged at the opposite side of said equatorial plane of the tyre.

A first end portion of said first groove and a second end portion of said second groove may be advantageously arranged in a same transverse portion of said tread band. Such transverse portion may extend longitudinally on said tread band up to a maximum corresponding to about half the longitudinal development of said first or said second groove.

Preferably, the central portion of the tread band wherein the above-mentioned first grooves are formed extends transversally over at most 40% of the axial development of said tread band.

Preferably, the sub-portion of said central portion which is left substantially free of grooves may extend transversally over at most 10% of an axial development of said tread band.

Advantageously, said sub-portion extends over at least 3% of an axial development of said tread band.

The tread band may have an overall void to rubber ratio greater than about 10%. Preferably, the overall void to rubber ratio is kept below about 25%.

The grooves of said second plurality of grooves may be arranged at a minimum average angle not lower than about 30° relative to the equatorial plane. In preferred embodiments, the grooves of said second plurality of grooves are arranged at an average angle not greater than 60° relative to the equatorial plane.

Said second plurality of grooves may for example comprise a set of groove pairs, wherein at least one extension of each groove pair of said second plurality of grooves intersects a groove of said first plurality of grooves.

Also the grooves of said second plurality of grooves may have a substantially curvilinear course such as to form a concavity.

In particular, the grooves of said first plurality of grooves and the grooves of said second plurality of grooves may be substantially formed by arcs of a circle. Such arcs of a circle may have substantially the same bending radius both in the grooves of the first and in the grooves of the second plurality of grooves.

The bending radius may be for example between 90 mm and 250 mm.

In some embodiments, the concavity of the grooves of said second plurality of grooves is directed according to a direction opposite to a preferred rolling direction of said tyre.

In alternative embodiments, the concavity of the grooves of said second plurality of grooves is directed according to a preferred rolling direction of said tyre.

In some embodiments, the concavity of the grooves of said first plurality of grooves is directed toward the equatorial plane of said tyre.

In alternative embodiments, the concavity of the grooves of said first plurality of grooves is directed according to a direction opposite to the equatorial plane of said tyre.

The invention may thus comprise a pair of motorcycle tyres, comprising a first tyre configured with the concavity of the grooves of said second plurality of grooves directed according to a direction opposite to a preferred rolling direction of said first tyre, adapted to be mounted on a rear wheel of said motorcycle, and a second tyre configured with the concavity of the grooves of said second plurality of grooves directed according to a preferred rolling direction of said second tyre, adapted to be mounted on a front wheel of said motorcycle.

The invention may further comprise, additionally or alternatively, a pair of motorcycle tyres, comprising a first tyre configured with the concavity of the grooves of said first plurality of grooves directed toward the equatorial plane of said first tyre, adapted to be mounted on a rear wheel of said motorcycle, and a second tyre configured with the concavity of the grooves of said first plurality of grooves directed according to a direction opposite to the equatorial plane of said second tyre, adapted to be mounted on a rear wheel of said motorcycle.

BRIEF DESCRIPTION OF THE DRAWINGS

Further features and advantages of the tyre of the present invention shall become clearer from the following detailed description of some embodiments thereof, made hereafter for indicative and non-limiting purposes with reference to the accompanying drawings. In such drawings.

DETAILED DESCRIPTION OF THE INVENTION

Figure 2:
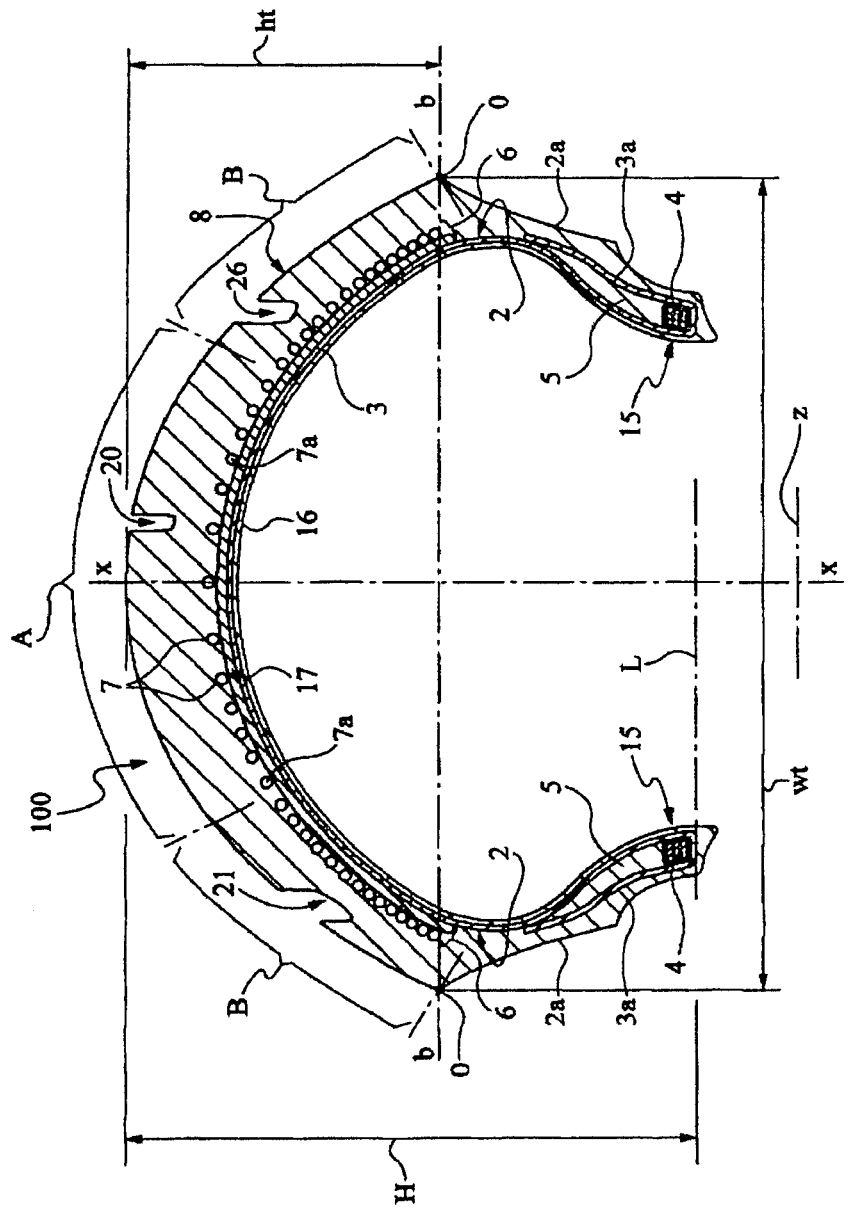
FIG. 2 shows a radial sectional view of a tyre according to the invention.

Referring to FIG. 2, a tyre for motorcycle wheels according to the present invention is globally indicated at 100. In particular, the tyre is preferably intended to be used on the front or rear wheel of a motorcycle for the sport or Supersport segment.

An equatorial plane X-X and a rotation axis Z are defined in the tyre 100. Moreover, there are defined a circumferential or longitudinal direction and an axial, or transverse, or lateral direction, perpendicular to the equatorial plane X-X.

The tyre 100 comprises a carcass structure 2 including at least one or two carcass plies 3.

The carcass structure 2 is preferably lined on its inner walls with a sealing layer 16, also called "liner", essentially consisting of a layer of an airproof elastomeric material, adapted to ensure the tight seal of the tyre itself after it has been inflated.

The carcass ply/plies 3 is/are engaged, at the respective axially opposite lateral edges 3a, with respective annular reinforcing structures 4 intended to hold the tyre on a corresponding fitting rim. The annular reinforcing structures 4 are typically called "bead cores".

A tapered elastomeric filler 5 taking up the space defined between the carcass ply or plies 3 and the respective turned lateral edge 3a of the carcass ply or plies 3 is applied onto the radially outer perimeter edge of the bead cores 4.

In an alternative embodiment, not shown, the carcass ply has its opposite lateral edges associated without a turn-up with special annular reinforcing structures provided with two metal annular inserts. In this case, a filling of elastomeric material can be arranged in an axially outer position with respect to the first annular insert. The second annular insert is instead arranged in an axially outer position with respect to the end of the carcass ply. Finally, in a axially outer position with respect to said second annular insert, and not necessarily in contact with the same, a further filling can be provided which finishes the formation of the annular reinforcing structure.

The region of the tyre comprising the bead ring 4 and the filler 5 defines the so-called "bead", globally indicated at 15 in FIG. 2, which is intended for anchoring the tyre to a corresponding fitting rim, not shown.

A belt structure 6 is provided in a radially outer position with respect to the aforementioned carcass structure.

A tread band 8, at which the tyre 1 contacts the ground, is provided in a radially outer position with respect to the belt structure 6.

The tyre may further comprise a pair of sidewalls 2a laterally applied to the carcass structure 2 at axially opposite sides of the equatorial plane X-X. The sidewalls extend from the tread band 8 to the bead 15 of the tyre.

The tyre 100 of the present invention is characterised by a high transverse curvature and lowered sidewalls.

The transverse curvature of a tyre is defined by the particular value of the ratio between the distance ht (FIG. 1) of the top of the tread band from the line b-b passing through the ends O of the tread, measured on the equatorial plane X-X, and the distance wt between said ends of the tread band. Should the ends of the tread band not be easily identifiable, for example due to the lack of a precise reference, such as for example the edge indicated at O in FIG. 2, the length of the maximum chord of the tyre can certainly be taken as the distance wt.

The value of the aforementioned transverse curvature is called "curvature ratio" of the tyre.

The tyre 100 of the present invention preferably has a curvature ratio greater than or equal to 0.2, preferably greater than or equal to 0.25. For front tyres, the curvature ratio can also be greater than 0.30. Such a curvature ratio is typically less than or equal to 0.8, preferably less than or equal to 0.5.

With regards to the sidewalls, on the other hand, the tyre of the present invention is preferably a tyre with particularly low sidewalls. By tyres with low or lowered sidewalls in the present description are meant tyres wherein the ratio between the distance (H-ht) and the height H, measured on the equatorial plane X-X between the top of the tread band and the fitting diameter, defined by the reference line L passing through the beads of the tyre, is less than 0.6, more preferably less than 0.5.

Each carcass ply 3 is preferably made from an elastomeric material and comprises a plurality of reinforcing elements (not shown) arranged parallel to one another.

The reinforcing elements included in the carcass plies 3 preferably comprise textile cords selected from those usually adopted in the manufacture of carcasses for tyres, for example nylon, rayon, lyocell, aramid, PET, PEN, with an elementary thread having a diameter between 0.35 mm and 1.5 mm. The reinforcing elements in the carcass ply 3 are preferably arranged in a substantially radial direction, i.e. according to an angle between 65° and 110°, more preferably between 80° and 100°, with respect to the equatorial plane X-X.

The belt structure 6 preferably comprises one or more rubberized cords 7, arranged parallel to one another and in side-by-side relationship in the axial direction on the crown portion 16 of the carcass structure 2, so as to form a plurality of coils 7a. Such coils are substantially oriented according to the circumferential direction of the tyre (typically with an angle between 0° and 5° with respect to the equatorial plane X-X of the tyre), such a direction usually being known as "at zero degrees" with reference to how it lies with respect to the equatorial plane X-X of the tyre. The aforementioned coils preferably extend over the entire crown portion of the carcass structure 2.

Preferably, the belt structure 6 is formed by a single cord 7, or by a rubberized fabric strip comprising preferably up to five cords arranged in side-by-side relationship. The cord or strip is spirally wound from one end to the other on the crown portion 16 of the carcass structure 2.

Alternatively, the belt structure 6 may comprise at least two radially superimposed layers, each consisting of elastomeric material reinforced with cords arranged parallel to one another. The layers are arranged so that the cords of the first belt layer are oriented obliquely (for example at an angle between 15° and 40°) with respect to the equatorial plane of the tyre, whereas the cords of the second layer also have an oblique orientation, but symmetrically crossed with respect to the cords of the first layer, so as to form the so-called "cross-belt".

The cords 7 of the belt structure 6 are textile or metal cords.

Preferably, for the use in a belt at zero degrees, such cords are made by steel wires with high carbon content, i.e. steel wires with a carbon content at least equal to 0.7%. Preferably, such cords 7 are metal cords made from steel of the high elongation (HE) type. The high elongation (HE) cords typically have an ultimate tensile strength higher than 3%. Typically, they have a load-elongation diagram comprising a curvilinear portion arranged between two substantially straight portions having different inclinations with respect to the axes of the diagram.

When textile cords are used, these can be made from a synthetic fiber, for example nylon, rayon, PEN, PET, preferably a synthetic fiber with high modulus, in particular synthetic aramid fiber (for example Kevlar® fibers). Alternatively, hybrid cords can be used comprising at least one thread with low modulus, i.e. with a modulus not greater than 15000 N/mm$^2$ (for example nylon or rayon), intertwisted with at least one thread with high modulus (for example Kevlar®), i.e. with a modulus not smaller than 25000 N/mm$^2$.

The belt structure 6 may also comprise one or more support layers 17 made from elastomeric material, interposed between the layer of cords 7 and the carcass ply 3 and on which the coils 7a are wound. Such layer(s) may extend on a surface having an axial extension substantially corresponding to the surface on which the coils 7a extend.

In a preferred embodiment of the tyre 100 of the present invention, a layer 17 is used comprising short aramid fibres, for example made from Kevlar®, dispersed in the elastomeric material.

In a further embodiment (not shown), in the belt structure 6 it can be used, additionally or alternatively to the layer reinforced with aramid fibres described above, at least a layer reinforced with textile cords (totally similar to the cords that can be used in the carcass structure 3), with a substantially radial orientation (for example between 65° and 110°). Such a layer extends at least on the crown portion 16 of the tyre 100, or also on a larger portion, but without a turn-up about the bead rings 4.

A tread pattern is formed on the tread band 8. Such pattern is defined by a plurality of grooves differently arranged along the circumferential and axial development of the tread band 8. Within a pitch of the tread pattern, such grooves define a module which is repeated substantially the same along the circumferential direction of the tyre 100.

In particular, in the tyre of the present invention the pattern formed on the tread band 8 can be divided into a central portion A and two shoulder portions B. The central portion A may extend over up to the 40% of the axial development of the tread band 8.

In the tyre section shown in FIG. 2 three grooves 20, 21, 26 are shown. The groove 20 lies in the central portion A, whereas the grooves 21, 26 lie in the shoulder portions B.

FIGS. 3-6 show portions of some embodiments of a tread pattern that can be used in a tyre according to the invention. Arrow F indicates the preferred tyre rolling direction. In particular, the embodiments of FIGS. 3 and 6 can be preferably used for rear tyres, whereas the embodiments of FIGS. 4 and 5 can be preferably used for rear tyres.

A tread pattern as in the examples shown in FIGS. 3-6 globally defines on the tread band 8 a void to rubber ratio higher than or equal to about 10%, preferably higher than or equal to about 12%. Preferably, the void to rubber ratio is lower than 25%.

In FIGS. 3-6 the central portion A, arranged at the equatorial plane X-X, and the two shoulder portions B, arranged at axially opposite sides of the central portion A, can be identified.

The central portion A is intended to contact the road surface when the motorcycle runs on a straight path or with a slight lean, whereas the shoulder portions B are intended to contact the road surface when the motorcycle runs on a bend with a more marked lean.

Preferably, the central annular portion A has an axial extension at most equal to 40% of the lateral development of the tread band 8.

The central portion A has a plurality of first grooves 20 separate from one another. Preferably, the void to rubber ratio in the central portion A is between about 8% and about 15%.

Figure 3:
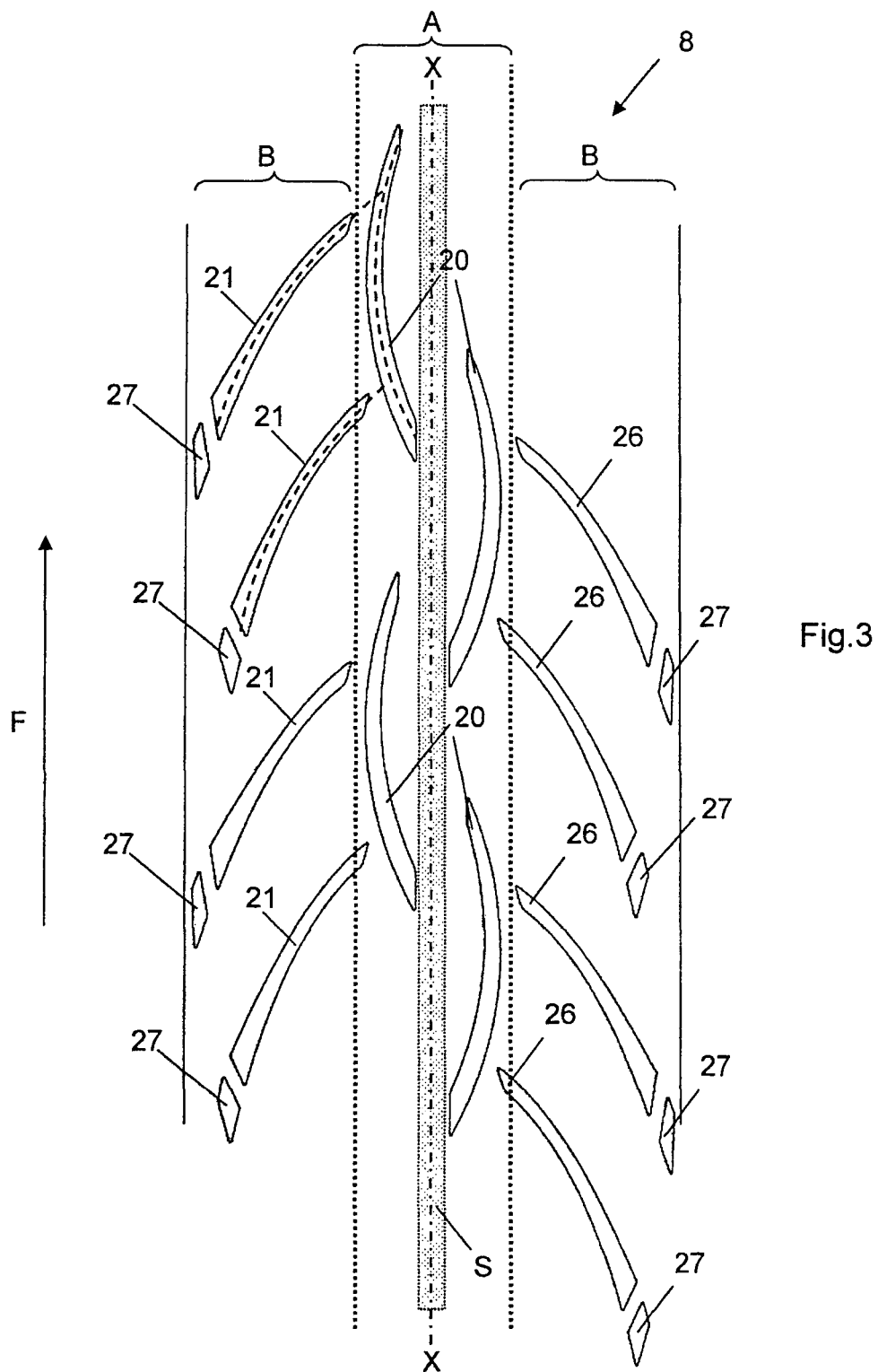
FIG. 3 shows a portion of the plan development of a portion of the tread band of tyre according to a first embodiment of the invention.
Figure 4:
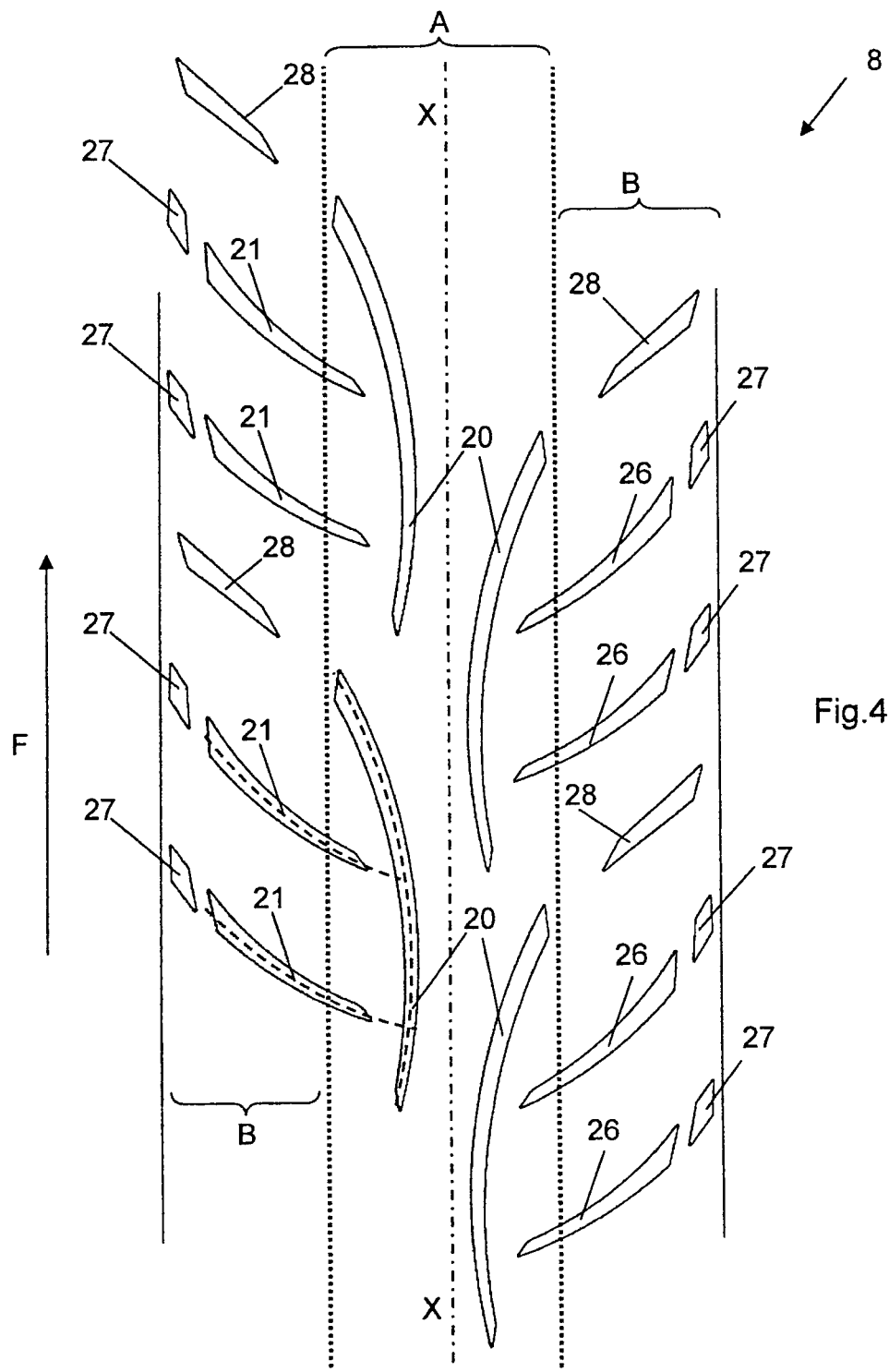
FIG. 4 shows a portion of the plan development of a portion of the tread band of a tyre according to a second embodiment of the invention.
Figure 5:
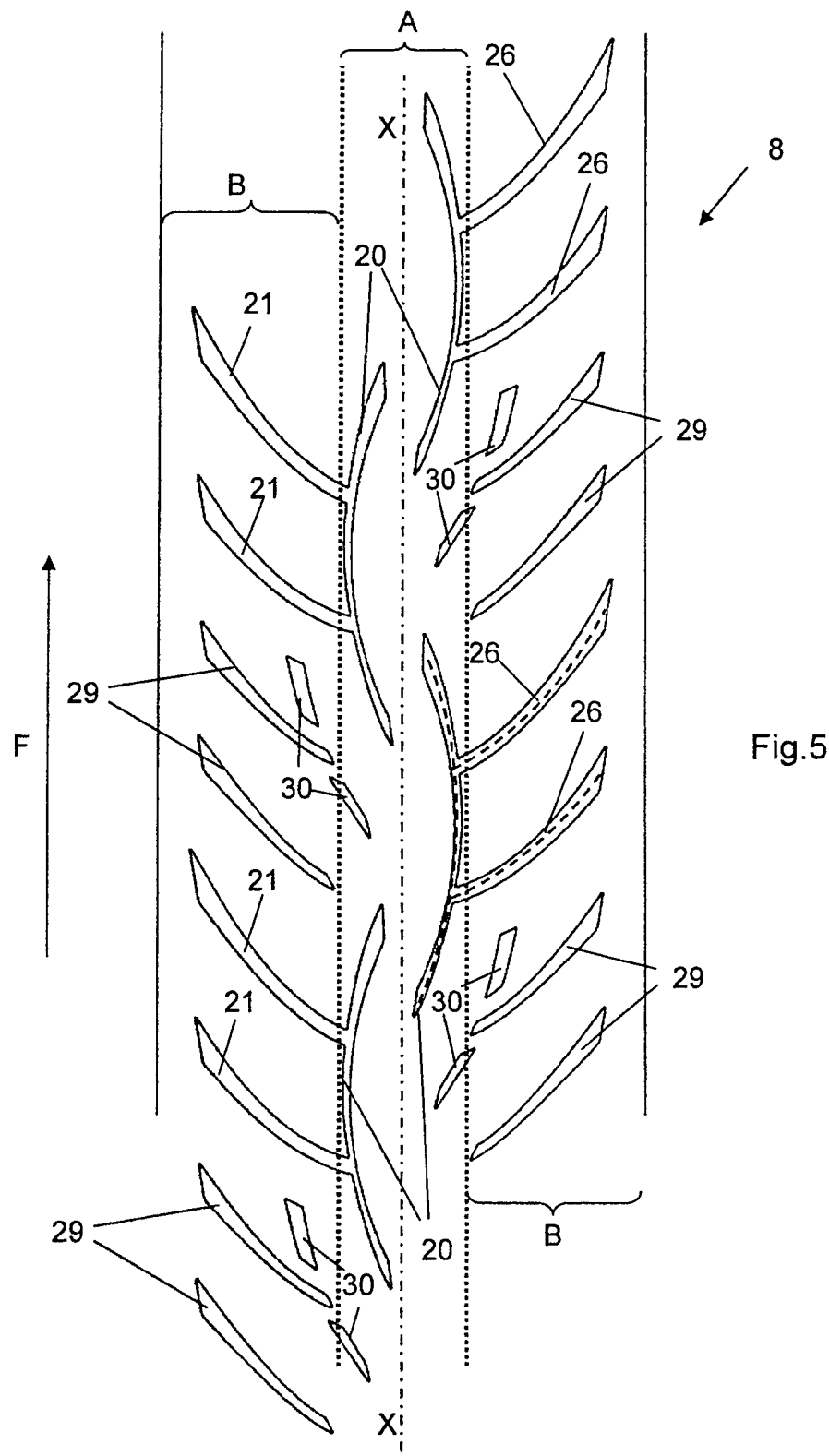
FIG. 5 shows a portion of the plan development of a portion of the tread band of a tyre according to a third embodiment of the invention.
Figure 6:
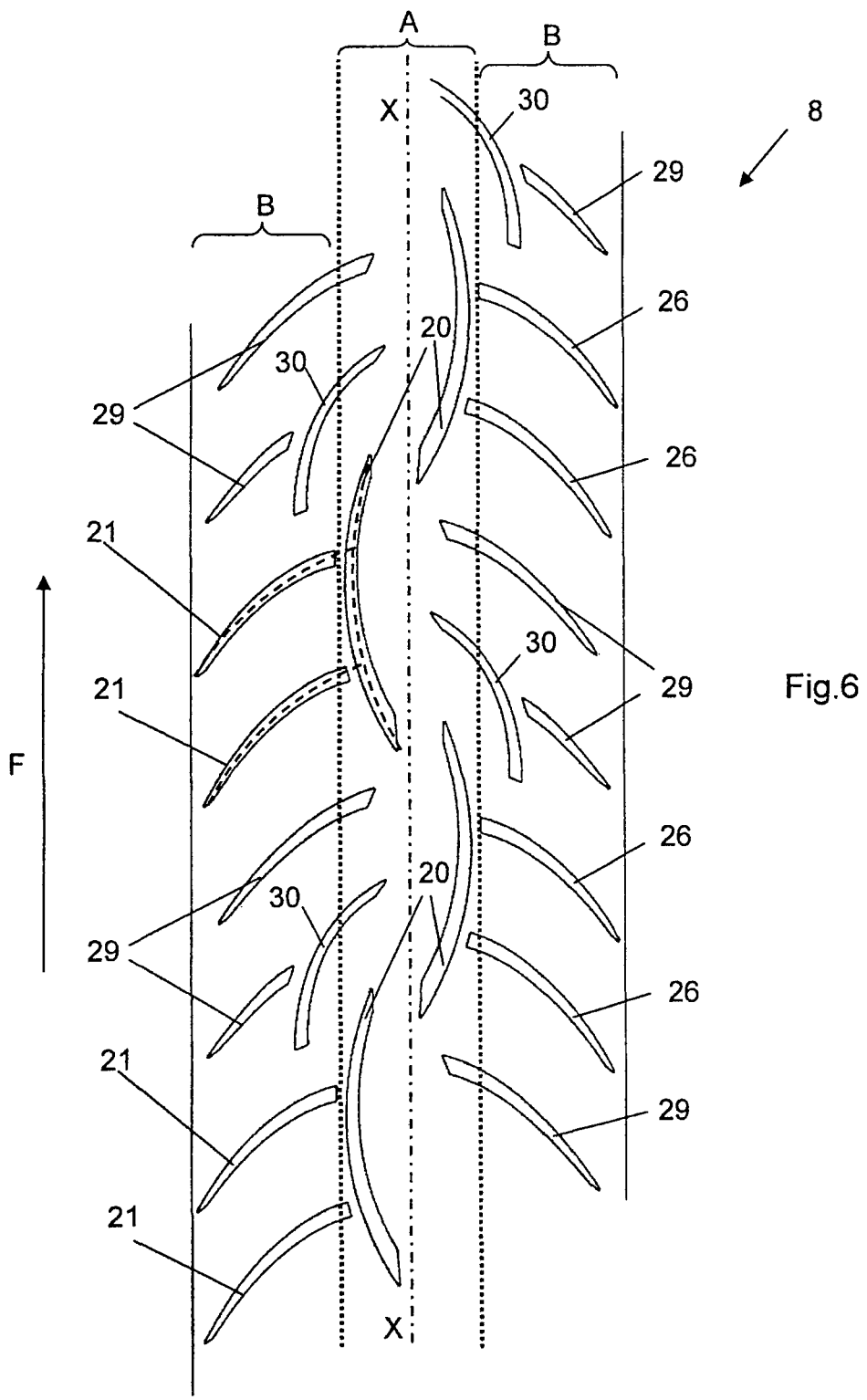
FIG. 6 shows a portion of the plan development of a portion of the tread band of a tyre according to a fourth embodiment of the invention.

The first grooves 20 extend according to a substantially longitudinal direction. Moreover, the grooves extend with a substantially curvilinear course. The curvilinear course of the first grooves 20 defines a concavity, which in the embodiments of FIGS. 3, 5, 6 is directed towards the equatorial plane X-X, whereas in the embodiment of FIG. 4 is directed according to a direction opposite to the equatorial plane X-X.

In a preferred embodiment, the first grooves 20 have a course substantially corresponding to an arc of a circle. Preferably, the bending radius of such arc of a circle is between about 90 mm and about 250 mm.

Preferably, the first grooves 20 extend over at least about 5% of the maximum longitudinal development of the tread band 8. They are therefore grooves with a substantial length, typically of the order of the longitudinal dimension of the footprint area formed by the tyre under a nominal load (about 200-250 kg for the Supersport and/or Sport Touring segment). This feature of the substantially curvilinear first grooves 20, together with their substantially longitudinal course, allows water to be drained during straight running on wet asphalt (or, in general, ground). Furthermore, it has been found that such arrangement of the first grooves 20 allows reducing the noise caused by the same when the tyre is rolling. Preferably, the first grooves 20 extend at most over about 25%, more preferably over about 10% of the maximum longitudinal development of the tread band 8.

The substantially longitudinal extension of each of the substantially curvilinear first grooves 20 makes a symmetry axis of the extension of such grooves to be oriented according to an angle substantially perpendicular to the equatorial plane X-X (for example with a maximum deviation lower than about 10° with respect to a direction perpendicular to the equatorial plane X-X).

For the purposes of the present invention, the symmetry axis of the extension of a groove may correspond to the direction perpendicular to one of the lines defining the general course of the groove itself, passing through the point which half divides the groove itself. The line defining the general course of a groove may be selected for example among one of the radially outer edges of the groove, the centre line of the groove and/or the line of maximum depth of the groove. In FIGS. 3-6 such general course is shown, as an example and for the sake of clarity only on some of the grooves of each pattern portion, by a dashed centre line.

In the embodiments shown in FIGS. 3-6, each pitch of the tyre comprises a pair of grooves 20, arranged at opposite sides with respect to the equatorial plane X-X.

The first grooves 20 of each pair are preferably staggered in the circumferential direction. In other words, the first grooves 20 alternate at opposite sides with respect to the equatorial plane X-X along the circumferential direction of the tyre, such that a first groove 20 arranged at one side with respect to the equatorial plane X-X is followed by a subsequent first groove 20 arranged at the opposite side with respect to the equatorial plane X-X.

While alternating at one side and the other of the equatorial plane X-X, the ends proximal with each other of two consecutive first grooves 20 may preferably be arranged in a same transverse portion of the tread band 8. In other words, it may be preferably provided that the end portions of two consecutive first grooves 20 can overlap longitudinally (remaining however axially spaced apart). The overlapping can advantageously extend even up to half the longitudinal development of one of the first grooves 20.

This allows at least one of the first grooves 20 to be always kept within the footprint area during straight running, so as to ensure good drainage when running on wet grounds.

The arrangement of the first grooves 20 in the central portion A of the tread band 8 is such that a central annular sub-portion (for the sake of clarity shown only in FIG. 3 by means of the shaded portion indicated at S) is formed astride the equatorial plane X-X, which have a void to rubber ratio substantially equal to zero. In other words, the first grooves 20 do not cross the equatorial plane X-X, but lie away from the same substantially along their entire extension, from one end to the other. In the embodiments shown in FIGS. 3, 5, 6 each of the first grooves 20 has its ends near the equatorial plane X-X, while the central portion lies farther from it. On the contrary, in the embodiment of FIG. 4 the ends of the first grooves 20 lie farther from the equatorial plane X-X compared to the central portion.

The central annular sub-portion S with substantially zero void to rubber ratio extends transversally over a portion of the axial development of the tread band between about 3% and about 10%.

Keeping a portion substantially free of grooves at the equatorial plane X-X allows the formation of a closed ring in the tread band with an extremely high stiffness in this portion, so that in straight running at high speed it is possible to effectively transfer to the ground the traction torque while accelerating and the braking torque while decelerating, at the same time ensuring an excellent stability to the motorcycle. This choice is thus extremely advantageous for the use both on a front and on a rear tyre.

Preferably, the first grooves 20 have a variable width along their extension.

In particular, in the embodiments of FIGS. 3 and 6, the width of the first grooves 20 increases in a direction opposite to the preferred rolling direction F of the tyre. This choice may be convenient for increasing the water drainage in a rear tyre during straight running on wet grounds. The width of the first grooves 20 may, for example, vary from a minimum of 2-4 mm to a maximum of 6-8 mm.

In the embodiments of FIGS. 4 and 5, the width of the first grooves 20 increases in the preferred rolling direction F of the tyre. This choice may be convenient in a front tyre, for effectively breaking and opening water films and/or layers during straight running on wet grounds.

The Applicant has found that the arrangement described above of the first grooves 20 allows the surface of the footprint area of the tyre to be increased. In particular, as it shall be shown hereinafter by means of an example, it has been found that the increase in the surface of the footprint area is due to an increase of the width of the same. The Applicant believes that this may be due to the fact that the first grooves 20 create a sort of "hinge", which allows the crown portion of the tyre to be moved radially in a region away from the equatorial plane, so as to increase the compliance thereof. Moreover, the Applicant believes that the curvilinear arrangement (i.e. an arrangement not aligned with the equatorial plane X-X of the tyre, apart from portions of least longitudinal extension) of the longitudinal grooves 20 allows the compliance of the crown region to be increased in a controlled and not excessive way, so as not to cause fatigue failure of the tread band at the first grooves 20 themselves. In the preferred embodiment shown in FIGS. 2-6, the compliance of the central portion A of the tyre crown determined by the presence of the first grooves 20 synergically cooperates with a further source of compliance introduced, in the same portion of the tyre, by the presence of a belt structure at zero degrees 6 under the tread band 8. According to tests performed by the Applicant, it has been found that tyres having this configuration achieve an excellent behaviour stability in straight running, together with a proper graduality when approaching a bend and/or during repeated direction changes. These results have been obtained using such a configuration for both the front tyre and the rear tyre.

Referring again to FIGS. 3-6, each shoulder portion B has a plurality of second grooves 21, 26 extending substantially transversally on the tread band 8. The second grooves 21, 26 are arranged so as to be axially in side-by-side relationship with the first grooves 20. In particular, the axially inner ends of the second grooves 21, 26 may either approach the first grooves 20 without intersecting them (as in the embodiments shown in FIGS. 3, 4 and 6) or terminate into the first grooves 20 themselves (as in the embodiment shown in FIG. 5). In any case, at least a continuation of the second grooves 21, 26 intersects the first grooves 20, as shown in FIGS. 3-6 by the dashed lines represented for a group of grooves 20, 21, 26 (in each figure).

In the preferred embodiments shown in FIGS. 3-6 the second grooves 21, 26 are divided into pairs. Each pair of second grooves 21, 26 is associated with a respective first groove 20 as mentioned above.

The intersection between the continuation of a pair of second grooves 21, 26 (or the pair of second grooves 21, 26 itself) and a first groove 20 preferably divides the latter into three portions with substantially the same longitudinal extension.

Preferably, the second grooves 21, 26 are arranged on the tread band 8 with a substantially curvilinear course. In general, the second grooves 21, 26 may have an average inclination between about 30° and about 90°, preferably between about 30° and about 60° with respect to the equatorial plane X-X.

In the embodiments shown in FIGS. 3 and 6, the concavity formed by the curvilinear course of the second grooves 21, 26 is directed in a direction opposite to the preferred rolling direction F. On the contrary, in the embodiments shown in FIGS. 4 and 5, the concavity formed by the curvilinear course of the second grooves 21, 26 is directed according to the preferred rolling direction F.

In a preferred embodiment, the second grooves 21, 26 have a course substantially corresponding to an arc of a circle. Preferably, the bending radius of such arc of a circle is between about 90 mm and about 250 mm.

The arcs of a circle forming, in preferred embodiments, the first and the second grooves 20, 21, 26 may advantageously be similar with one another. In practice, for grooves having a considerable extension on the tread band, such a substantial similarity may correspond to differences up to about 50%-60% of the larger bending radius. In fact, arcs of a circle with bending radius respectively equal to e.g. 100 mm and 180 mm may be practically non-distinguishable at sight, without using measuring instruments.

The Applicant believes that the arrangement of extended grooves having substantially the same bending radius (within the meaning indicated above) improves the distribution of the elastomeric material forming the tread band during the tyre moulding and vulcanization, so as to obtain a better quality and uniformity of the tread band itself in the moulded and vulcanized tyre. In fact, similar bending radiuses for the elements projecting from the surface of the mould and intended for forming the grooves, displace substantially in the same way the green elastomeric material during moulding, thus avoiding undesired accumulation of material.

Preferably, the second grooves 21, 26 have a variable width. In particular, the second grooves 21, 26 may have a width which increases from the axially innermost end towards the axially outermost end. The width of the second grooves 21, 26 may vary e.g. from a minimum of 2-4 mm to a maximum of 6-8 mm.

Besides the above-mentioned first and second grooves 20, 21, 26, the tread band may comprise further grooves and/or set of grooves, based on the technical or aesthetic requirements of the tyre.

As an example, in the embodiments shown in FIGS. 3 and 4, a set of short cuts is added at the axially outermost region of the shoulder portions B. In particular, the short cuts 27 are formed substantially at a continuation of the second grooves 21, 26. Such short cuts 27 may improve the tyre behaviour while running on a bend with maximum lean on wet grounds and/or make easier the warming of the tread band in the axially outermost portion due to compound deformation.

In the embodiment of FIG. 4, in the shoulder portions B it is further formed a set of third grooves 28 alternating with the second grooves 21, 26. The third grooves 28 have a lower extension than the extension of the second grooves 21, 26. Also these grooves may improve the tyre behaviour, particularly in a front tyre, when running on a bend on wet grounds.

In the embodiments of FIGS. 5 and 6, a set of groove pairs 29 is alternated, in the shoulder portions B, with the second grooves 21, 26. In the embodiment of FIG. 6 the grooves of the groove pair 29 have an extension different from each other. Also these grooves may improve the tyre behaviour, particularly in a front tyre, when running on a bend on wet grounds.

In both the embodiments of FIGS. 5 and 6 a plurality of grooves 30 is further formed in transition region between the central portion A and the shoulder portions B of the tread band 8. Such grooves 30 may be formed for locally modifying the void to rubber ratio in the tread band 8, so as to improve the tyre behaviour graduality when approaching a bend and/or when running with frequent direction changes.

Figure 1B:
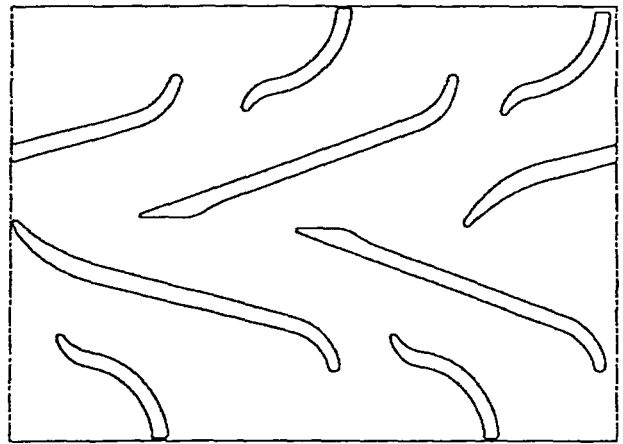
FIGS. 1a and 1b show portions of the tread pattern of known tyres, as described above.
Figure 7:
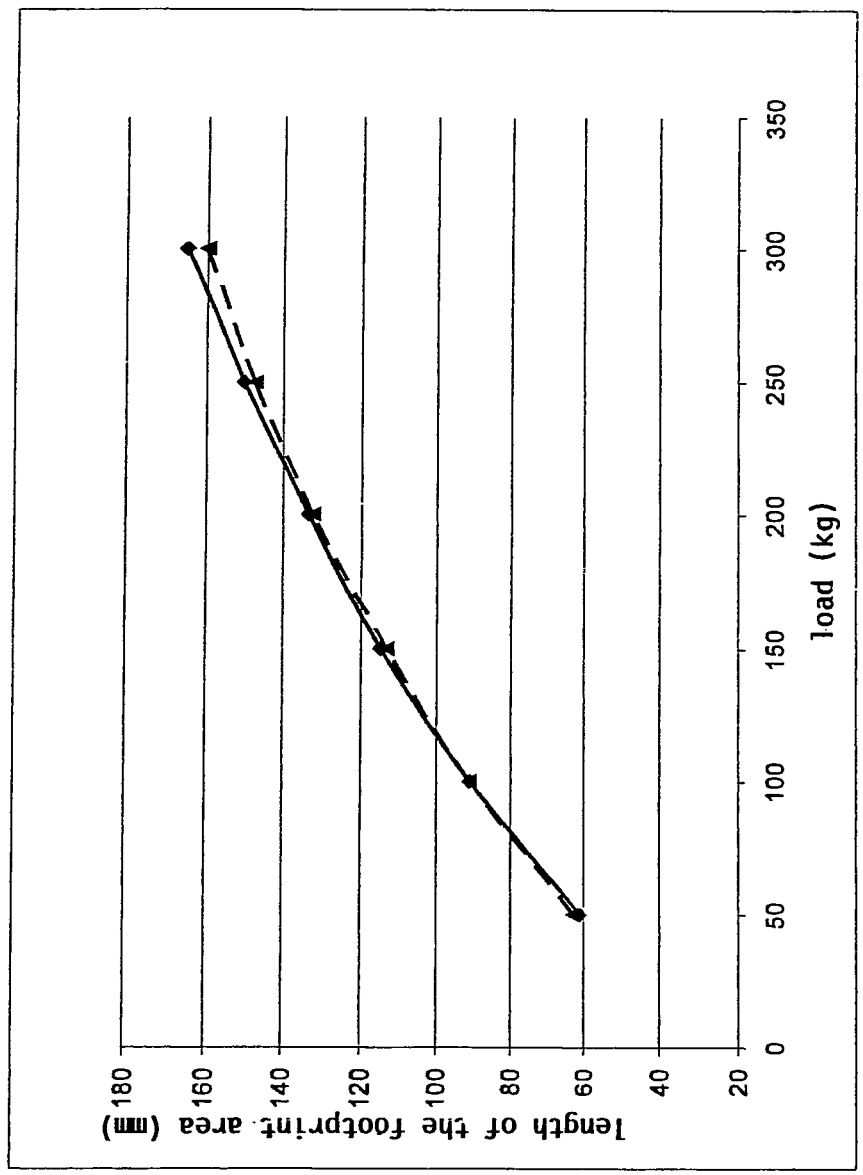
FIG. 7 shows a comparison of the trend of the length of the footprint area as a function of the load in a known tyre (FIG. 1a) and in a tyre according to the invention (FIG. 3)
Figure 8:
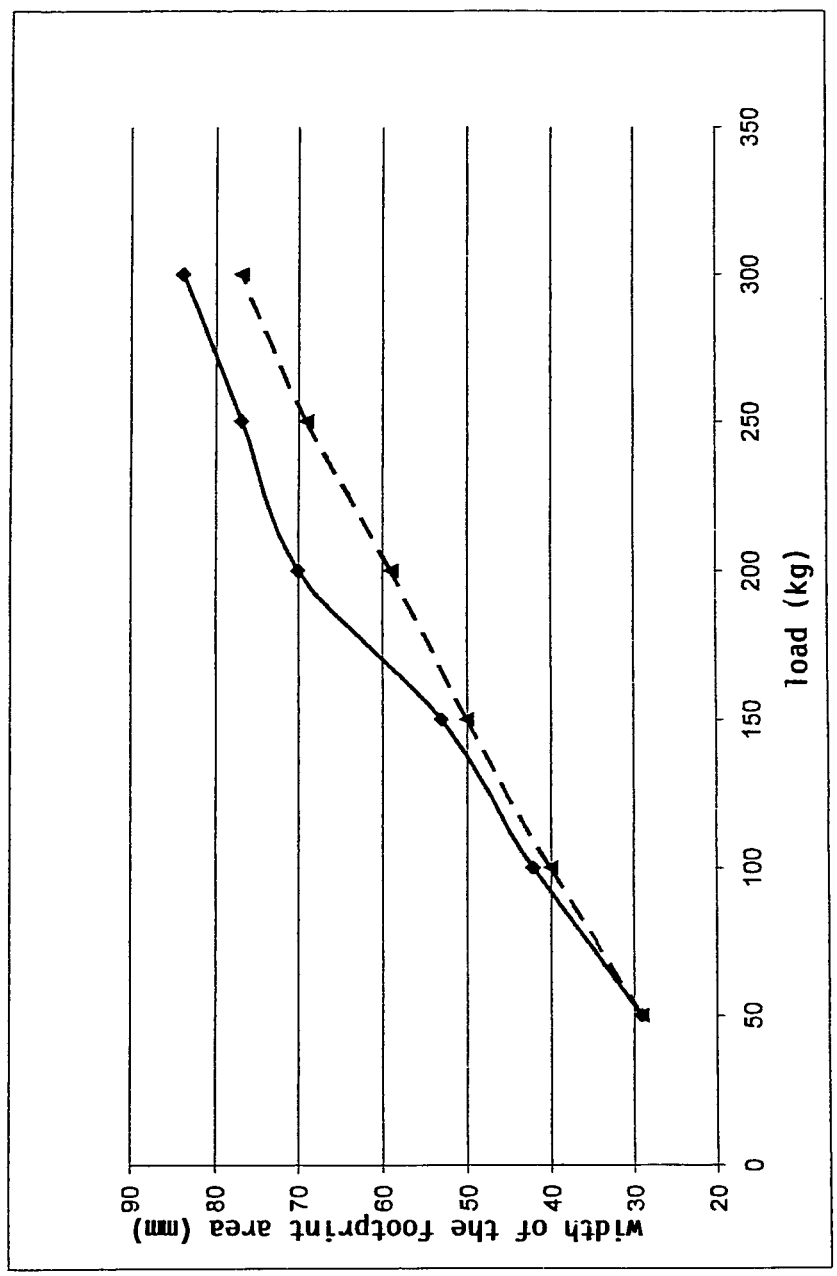
FIG. 8 shows a comparison of the trend of the width of the footprint area as a function of the load in a known tyre (FIG. 1a) and in a tyre according to the invention (FIG. 3).

FIGS. 7 and 8 show the results of static deflection tests at different loads on a tyre having a tread band as in FIG. 1b (comparison) and a tyre having a tread band as in FIG. 3 (invention). Both tyres had size 180/55 R17 and were different only in the tread band (same inner structure, same compound of the tread band). During the tests the length and width of the footprint area, i.e., respectively, the longitudinal dimension and the transverse dimension of the footprint area, have been measured. FIGS. 7 and 8 show the behaviour, respectively, of the length and of the width of the footprint area for the comparison tyre (dashed line, triangles) and the tyre of the invention (continuous line, squares).

As apparent from FIGS. 7 and 8, while the length of the footprint area remains substantially the same for all the tested load values (FIG. 7), there is a significant increase in the width of the footprint area, particularly starting from loads of about 200 kg. Such load value basically corresponds the nominal load of tyres for motorcycles of the Supersport and/or Sport Touring segment.

In the following, in tables 1 and 2, the results obtained in drive tests performed with different tyre sets mounted on the wheel of a motorcycle (Yamaha YZF R1) representative of the Supersport segment, but suitable for providing useful indication of the behaviour stability also for the Sport Touring segment, are reported.

Figure 1A:
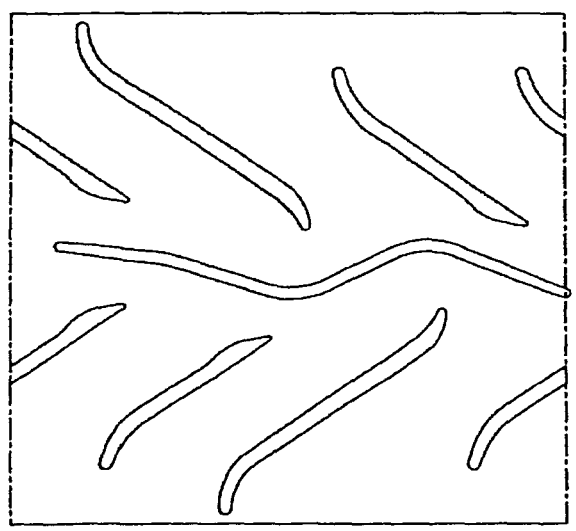

In table 1 a comparison between a set comprising a front tyre having a tread pattern as in FIG. 1a (comparison) and a set comprising a front tyre having a tread pattern as in FIG. 4 (invention) is reported. Both tyres had the same size (120/70 R17), as well as the same structure and tread band compound.

In table 2 a comparison between a set comprising a rear tyre having a tread pattern as in FIG. 1b (comparison) and a set comprising a rear tyre having a tread pattern as in FIG. 3 (invention) is reported. Both tyres had the same size (190/55 R17), as well as the same structure and tread band compound.

In tables 1 and 2 the assessments obtained from the tyre according to the invention as compared with the comparison tyre are reported for parameters typical for a drive on mixed paths (steering promptness, handling during changes of direction, lateral thrust while leaning, insertion into a bend at high speed, graduality while leaning) and parameters typical for a drive on straight paths (centering, reactivity to speed changes, compliance/behaviour stability). The assessments are expressed on a scale ranging from 1 to 5, where 3 represents an acceptable behaviour and 4 represents an excellent behaviour.

TABLE 1

(front)

|  | 1st Set (comparison) | 2nd Set (invention) |
| --- | --- | --- |
| Promptness | 3.90 | 4.00 |
| Handling | 3.80 | 4.00 |
| Thrust | 4.00 | 4.25 |
| Insertion at high speed | 4.00 | 4.25 |
| Graduality while leaning | 4.00 | 4.15 |
| Centering | 4.15 | 4.25 |
| Reactivity | 4.00 | 4.15 |
| Yielding | 4.00 | 4.15 |

TABLE 2

(rear)

|  | 1st Set (comparison) | 2nd Set (invention) |
| --- | --- | --- |
| Promptness | 3.90 | 4.00 |
| Handling | 3.80 | 3.90 |
| Thrust | 4.00 | 4.25 |
| Insertion at high speed | 4.00 | 4.15 |
| Graduality while leaning | 4.00 | 4.15 |
| Centering | 4.15 | 4.25 |
| Reactivity | 4.00 | 4.00 |
| Yielding | 4.00 | 4.00 |

As apparent from the tables reported above, the tyre according to the invention has globally a better behaviour, both in the case of the front tyre and in the case of the rear tyre, compared to the already excellent comparison tyre considered.

The tests described above have been carried out on dry road ground. A series of tests performed on wet road ground showed a similar behaviour for the two kind of tyres.

The overall results of the tests thus showed a global improvement of the tyre of the invention compared to the comparison tyre during straight running, without negatively affecting adherence and/or the behaviour on wet grounds. Such a result is remarkable and surprising taking into account that the introduction of the sub-portion free of grooves at the equatorial plane might have instead caused a worsening of adherence and stability on wet grounds, particularly in straight running. The Applicant believes that the increased leaning corresponding to the increase in the width of the footprint area allowed this possible drawback to be avoided, also improving the stability in straight running and, above all, the promptness and handling on mixed paths.

The present invention has been described with reference to some embodiments thereof. Many modifications can be made in the embodiments described in detail, still remaining within the scope of protection of the invention, defined by the following claims.

The invention claimed is:

1. A motorcycle tyre comprising a tread band comprising a central portion and two shoulder portions arranged at axially opposite sides of the central portion, wherein:
the central portion comprises a first plurality of grooves separate from one another, and extended according to a substantially longitudinal direction and alternatively arranged at opposite sides of an equatorial plane of said tyre, wherein each groove of said first plurality of grooves has a substantially curvilinear course thereby forming a concavity directed toward the equatorial plane of said tyre;
the central portion comprises a sub-portion substantially free of grooves placed astride an equatorial plane of said tyre; and
each of said shoulder portions comprises a second plurality of grooves arranged obliquely relative to the equatorial plane of said tyre,
wherein the grooves of said second plurality of grooves have a substantially curvilinear course thereby forming a concavity, and
wherein the grooves of said first plurality of grooves and the grooves of said second plurality of grooves are substantially formed by arcs of a circle, said arcs of a circle having substantially a same bending radius both in the grooves of the first and in the grooves of the second plurality of grooves.

2. The tyre according to claim 1, wherein each groove of said first plurality of grooves extends longitudinally over at least 5% of a maximum longitudinal length of said tread band.

3. The tyre according to claim 1, wherein said first plurality of grooves is formed by a circumferential sequence of groove pairs comprising a first groove and a second groove, wherein said first groove is arranged at one side of said equatorial plane of the tyre and said second groove is arranged at the opposite side of said equatorial plane of the tyre.

4. The tyre according to claim 3, wherein a first end portion of said first groove and a second end portion of said second groove are arranged in a same transverse portion of said tread band.

5. The tyre according to claim 4, wherein said transverse portion extends longitudinally on said tread band over at most half a longitudinal length of said first or said second groove.

6. The tyre according to claim 1, wherein said central portion extends transversally over at most 40% of an axial length of said tread band.

7. The tyre according to claim 1, wherein said sub-portion of said central portion extends transversally over at most 10% of an axial length of said tread band.

8. The tyre according to claim 1, wherein said sub-portion of said central portion extends transversally over at least 3% of an axial length of said tread band.

9. The tyre according to claim 1, wherein the tread band has a void to rubber ratio between 10% and 25%.

10. The tyre according to claim 1, wherein the grooves of said second plurality of grooves are arranged at an average angle not less than 30° relative to the equatorial plane of said tyre.

11. The tyre according to claim 1, wherein the grooves of said second plurality of grooves are arranged at an average angle not greater than 60° relative to the equatorial plane of said tyre.

12. The tyre according to claim 1, wherein said second plurality of grooves comprises a set of groove pairs, and wherein at least one extension of each groove pair of said second plurality of grooves intersects a groove of said first plurality of grooves.

13. The tyre according to claim 1, wherein said bending radius is between 90 mm and 250 mm.

14. The tyre according to claim 1, wherein the concavity of the grooves of said second plurality of grooves is directed according to a direction opposite to a preferred rolling direction of said tyre.

15. The tyre according to claim 1, wherein the concavity of the grooves of said second plurality of grooves is directed according to a preferred rolling direction of said tyre.

* * * * *